United States Patent [19]

Ikemoto

[11] 4,306,060

[45] Dec. 15, 1981

[54] PROCESS FOR PREPARATION OF CELLULOSE ACETATE

[75] Inventor: Yoshiyuki Ikemoto, Himeji, Japan

[73] Assignee: Daicel Chemical Industries, Ltd., Osaka, Japan

[21] Appl. No.: 216,735

[22] Filed: Dec. 15, 1980

[51] Int. Cl.³ .......................... C08B 1/02; C08B 3/06; C08B 3/24

[52] U.S. Cl. ....................................... 536/69; 536/71; 536/73; 536/76

[58] Field of Search ........................ 536/69, 71, 73, 76

[56] References Cited

U.S. PATENT DOCUMENTS

| | | | |
|---|---|---|---|
| 2,478,425 | 8/1949 | Richter et al. ........................ | 536/71 |
| 3,109,743 | 11/1963 | Fleck et al. ........................... | 536/76 |
| 3,767,642 | 10/1973 | Campbell et al. ..................... | 536/69 |
| 4,269,972 | 5/1981 | Yabune et al. ........................ | 536/71 |

FOREIGN PATENT DOCUMENTS

| | | | |
|---|---|---|---|
| 481583 | 3/1952 | Canada ................................. | 536/76 |
| 511682 | 4/1955 | Canada ................................. | 536/69 |
| 521022 | 1/1956 | Canada ................................. | 536/76 |

*Primary Examiner*—Ronald W. Griffin
*Attorney, Agent, or Firm*—Blanchard, Flynn, Thiel, Boutell & Tanis

[57] ABSTRACT

Cellulose acetate is prepared acetylating cellulose at a high temperature of 50°–85° C. and then ripening the acetylated cellulose at a high temperature of 110°–120° C.

3 Claims, No Drawings

PROCESS FOR PREPARATION OF CELLULOSE ACETATE

The present invention relates to a process for the preparation of cellulose acetate. More particularly, the invention relates to a process for the preparation of cellulose acetate, in which the acetylating step and the ripening step are accomplished in a short time.

A widely used process for the preparation of cellulose acetate comprises (1) a pretreatment step (activating step) of mixing a cellulose material having a high α-cellulose content with a small amount of an acid, (2) an acetylating step of treating the pretreated cellulose material with a mixed acid of acetic anhydride, acetic acid and an acidic catalyst, such as sulfuric acid, to obtain primary cellulose acetate, (3) a ripening step of hydrolyzing, according to need, the primary cellulose acetate obtained by the acetylation step to obtain cellulose acetate or cellulose acetate having a higher acetylation degree and (4) a purifying step of separating and purifying the obtained cellulose acetate by precipitation, solid-liquid separation, washing and drying.

The foregoing process for the preparation of cellulose acetate, which is widely adopted at the present, has the following disadvantages:

(a) Although a large quantity of reaction heat is produced during the acetylating step, the acetylation reaction is carried out at a temperature lower than room temperature by cooling the reaction mixture. Accordingly, a large quantity of energy is necessary for cooling.

(b) During the ripening step, a part of the acetic acid ester connected to the cellulose portion of primary cellulose acetate is hydrolyzed. During this step, however, the ether linkage of the cellulose main chain is liable to be broken by hydrolysis. This tendency is prominent when sulfuric acid, added as the acetylation reaction catalyst, is coupled with cellulose in a large amount, and an excessive reduction of the degree of polymerization results. In order to isolate sulfuric acid bonded to cellulose, while preventing reduction of the degree of polymerization, and to effect hydrolysis to a desired degree of acetylation, the hydrolysis is ordinarily conducted for a very long time at a temperature slightly higher than ambient temperature, but lower than 40° C.

(c) A cellulose starting material having a very high quality and a high α-cellulose content should be used. In the case of wood pulp, there is a quality standard for the acetate grade wood pulp.

We have conducted research with a view to overcoming these defects of the conventional process for the preparation of cellulose acetate, and we have now completed the present invention.

In accordance with the present invention, there is provided a process for the preparation of cellulose acetate, which comprises (A) an acetylating step of adding to activated cellulose, an acid mixture containing acetic anhydride in an amount of from 2 to 4 times the amount of the cellulose and an acidic catalyst in an amount of less than 1/20 of the amount of the cellulose, elevating the temperature to 50° to 85° C. over a period of 20 to 60 minutes at a substantially uniform temperature elevating rate and maintaining the reaction mixture at said temperature for from 3 to 20 minutes, and (B) a ripening step of neutralizing the acidic catalyst in the primary cellulose acetate mixture obtained by the acetylating step and hydrolyzing the mixture at a temperature of 110° to 120° C. in a bath in which water is incorporated.

The process of the present invention has the following advantages.

(a) The time required for the ripening step is shortened to about 1/10 of the time required in the conventional process.

(b) The time required for the acetylating step is shortened to 1/5, or less, of the time required in the conventional process.

(c) The energy required for cooling at the acetylating step is remarkably reduced.

(d) The filtering characteristic of the obtained cellulose acetate is improved, and a cellulose starting material having a slightly lower quality can be used.

The preparation process of the present invention will now be described in detail.

The cellulose-activating treatment is performed by mixing a starting cellulose material with acetic acid, or a mixture of acetic acid and sulfuric acid, in an amount smaller than ¼ of the weight of the starting cellulose material for 20 to 60 minutes. In the acetylating step, to the activated cellulose is added a mixture containing acetic anhydride in an amount of from 1.5 to 6 times, preferably from 2 to 4 times, the amount of the activated cellulose and an acidic catalyst in an amount larger than 1/200 and smaller than 1/20 of the weight of the activated cellulose, and the temperature is elevated to 50° to 85° C. over a period of 20 to 60 minutes and this temperature is maintained for 3 to 20 minutes to effect acetylation. In the ripening step, the acidic catalyst contained in the primary cellulose acetate mixture is completely neutralized, and water is incorporated in a bath and hydrolysis is carried out at a temperature of 110° to 120° C. for 2 to 10 hours.

The process of the present invention is distinguishable from the conventional process in the feature that the temperature employed in the acetylation step is high. Since the acetylation reaction is an exothermic reaction, in order to control the reaction, it is necessary to perform external cooling of the reaction mixture or to cool the acid mixture in advance. In the present invention, by carrying out the latter stage of the acetylating step at a temperature higher than ambient temperature, the energy necessary for cooling can be reduced and the time required for cooling can be remarkably shortened. According to the conventional process, if the temperature is elevated at the acetylating step without any additional modifications of the conventional process, a good product cannot be obtained. More specifically, acetylation is not advanced uniformly and also hemicellulose and other impurities are acetylated and incorporated in the resulting product whereby to degrade the filtering characteristics and other desired properties of the product.

We have conducted research and discovered that the temperature can be elevated in the acetylating step, with safety, provided that the following conditions are adopted.

(1) The amount of the acid used in the activating step is reduced and the mixing time is shortened.

(2) The amount of the acidic catalyst used in the acetylation reaction step is reduced.

(3) High-temperature hydrolysis conditions are employed in the ripening step.

According to the process of the present invention, even if the acetylation reaction is carried out at a high final temperature, a product having a good stability and a good filtering characteristic can be obtained.

It is quite surprising and unexpected that when the high-temperature hydrolysis step is combined with the high-temperature acetylating step, in the process for the preparation of cellulose acatate, a product which is excellent in the filterability and spinnability can be obtained.

In the conventional low-temperature hydrolysis process, scores of hours are necessary for completion of the ripening step. Therefore, in order to increase the manufacturing efficiency, research has been conducted with a view to developing a ripening method using high-temperature hydrolysis conditions. However, in the hydrolysis step, depolymerization of the main cellulose chain is prominent at high temperatures. Therefore, in order to prevent reduction of the degree of polymerization of the cellulose, there has been proposed a method in which high-temperature hydrolysis is carried out after the acidic catalyst has been completely neutralized (see Japanese Patent Application Laid-Open Specification No. 17580/73). However, if a large quantity of a neutralizing agent is employed, a large amount of a salt is formed in the reaction mixture and good filterability cannot be obtained.

In the process of the present invention, because the amount of the acidic catalyst used in the acetylating step is reduced, the amount added of the neutralizing agent can be reduced, with the result being that the amount formed of the salt can be reduced. When the amount of the acidic catalyst employed in the acetylating step is reduced, in the primary cellulose acetate obtained by the acetylating step, the amount bonded of the acidic catalyst is small, and the solubility of this cellulose acetate in a water-containing hydrolyzing bath is lower than the solubility of a primary cellulose acetate containing a large amount of the bonded acidic catalyst. Therefore, when water is added to the hydrolyzing bath, a gelation product is formed and this gelation product is a serious factor for degrading the filterability of the product. In the present invention, however, because steam is directly introduced into the hydrolyzing bath, the contact with water is carried out at a high temperature and a stirring effect is attained by bubbling of the introduced steam. Accordingly, formation of the gelation product is prevented and a product having a good filterability can be obtained. Furthermore, the acetic acid ester of hemicellulose formed under high-temperature acetylating conditions is depolymerized under high-temperature hydrolysis conditions into components soluble in an aqueous solution of acetic acid. Therefore, this ester of hemicellulose can be removed in the precipitation step. This is another advantage attained by the present invention.

In the process of the present invention, also, the time required for the activating treatment can be shortened as compared with the time required in the conventional process.

When the present invention is carried out, using the combination of the steps described above, the total time required for the entire process can be remarkably shortened as compared with the total time required in the conventional process. Therefore, the conditions of the present invention can be adopted for the continuous manufacture of cellulose acetate.

As the acidic catalyst, there may be used sulfuric acid, hydrochloric acid, perchloric acid and p-toluene sulfonic acid. The acidic catalyst may be added to the reaction mixture during the activating step or acetylating step, and moreover it may be used separately on the activation and the acetylation. In this case, the total amount of the catalyst is required to be within the above mentioned range.

The activation temperature is preferred to be around ambient temperature, or increased up to 50° C.

The present invention will now be described with reference to the following illustrative Examples.

In the Examples, the physical properties of the cellulose acetate products were determined according to the following methods.

Degree of Acetylation

The degree of acetylation was determined according to the method of ASTM D-871 (1970 edition, volume 15, page 272).

Viscosity

The viscosity was determined by the falling ball method. More specifically, a steel ball having a diameter of 6.32 mm and a weight of 1.043 g was allowed to fall down in a tube having an inner diameter of 25.9 mm, which tube was filled with a 20% by weight acetone solution of the sample maintained at $25+0.1°$ C. The time (seconds) required for the steel ball to drop in the tube a distance of 10 cm was measured and the viscosity is expressed by this time. In the case of cellulose acetate to be used for making fibers, when the viscosity is 15 to 30 seconds, a good spinnability can be obtained, and the strength and elongation of the resulting yarn are high. If the viscosity is lower than 15 seconds, the strength and elongation of the fibers are reduced.

Filterability

A 50% by weight acetone solution of the sample was passed through a filter cloth at 50° C. and the amount of the filtrate that passed through the filter cloth under a predetermined pressure was measured. The filtrability Kw is calculated according to the following equation:

$$Kw = \frac{2 - \frac{P2}{P1}}{P1 + P2} \times 10^4$$

wherein P1 represents the amount (cc) of the filtrate obtained during the period of 20 minutes beginning with the start of the filtration and P2 represents the amount (cc) of the filtrate obtained during a period beginning with the time of 20 minutes after the start of filtration and ending with the time of 60 minutes from the start of the filtration.

A smaller value of Kw indicates a better filterability.

EXAMPLE 1

Wood pulp having an α-cellulose content of about 97 wt. % (dry basis) was pulverized and dried so that the water content thereof was reduced to about 5 wt. %. The pulp was charged into a pretreating apparatus, and the pulp was mixed with glacial acetic acid in an amount of 25 parts by weight per 100 parts by weight of the α-cellulose and they were blended at 50° C. for 30 minutes to effect the pretreatment for activation of the cellulose. The activated cellulose was transferred to a kneading acetylating machine, and 280 parts by weight of acetic anhydride and 450 parts by weight of glacial acetic acid, which were precooled to 10° C. in advance, were added and 3 parts by weight of concentrated sulfuric acid was further added. Although heat was generated by the reaction, cooling of the reaction mixture was adjusted so that the temperature thereof was elevated from 10° C. to 68° C. in the reaction system at a substantially constant rate over a period of 50 minutes. The reaction mixture was maintained at 68° C. for 10 minutes to effect the acetylation reaction.

Then, 24 parts by weight of a 20% by weight aqueous solution of magnesium acetate was added to the reaction mixture at 68° C. The amount of magnesium acetate was in excess relativeto the stoichiometric amount necessary for neutralizing the sulfuric acid present in the reaction mixture. The completely neutralized product was transferred to an autoclave and steam was introduced under agitation under a gauge pressure of 5 Kg/cm$^2$. After the temperature was elevated to 120° C., the reaction mixture was stirred at 120° C. for 130 minutes to effect the aging reaction.

The reaction product of the ripening reaction was promptly cooled below 100° C. and was transferred to a sedimentation tank. Water was added to precipitate the thus-formed cellulose acetate. The precipitate was separated from the liquid by a centrifugal separator, transferred to a washing tank, washed with water sufficiently, taken out from the washing tank and dried.

The thus-obtained cellulose acetate flakes were characterized by an acetylation degree of 55 wt. %, a viscosity of 25 seconds and a filterability of 150. This product was excellent in the filterability and spinnability.

EXAMPLE 2

Wood pulp having an α-cellulose content of about 97 wt. % (dry basis) was pulverized and dried so that the water content was reduced to about 4%. An acid mixture containing 24 parts by weight of glacial acetic acid and 1 part by weight of concentrated sulfuric acid was blended with 100 parts by weight of α-cellulose, at 30° to 40° C., for 30 minutes to effect the pretreatment for activation of cellulose. Then, 260 parts by weight of acetic anhydride and 380 parts by weight of glacial acetic acid were added to the activated cellulose. Cooling was adjusted so that the temperature in the reaction system was elevated from 18° C. to 70° C. at a substantially uniform rate over a period of 40 minutes, and the reaction mixture was maintained at 70° to 75° C. for 10 minutes to effect acetylation reaction. Then, 6 parts by weight of a 26% by weight aqueous solution of magnesium hydroxide was added to and blended with the reaction mixture. The amount of magnesium hydroxide was slightly in excess relative to the amount necessary for completely neutralizing the sulfuric acid contained in the reaction mixture. Then, ripening, precipitation, washing and drying were carried out in the same manner as described in Example 1. The obtained cellulose acetate was characterized by an acetylation degree of 54.8%, a viscosity of 22 seconds and a filtration degree of 120. It was excellent in the filterability and spinnability.

EXAMPLE 3

To the same amount of the same activated cellulose obtained in the activation step described in Example 1, were added 280 parts by weight of acetic anhydride and 450 parts by weight of glacial acetic acid, and than 0.5 part by weight of concentrated sulfuric acid was added to the mixture. Cooling was adjusted so that the temperature of the reaction mixture was elevated from 20° C. to 80° C. at a substantially constant rate over a period of 40 minutes, and then an acetylation reaction was carried out at about 80° C. for 5 minutes. The ripening reaction and subsequent treatments were carried out in the same manner as described in Example 1. The obtained cellulose acetate was characterized by an acetylation degree of 55.2%, a viscosity of 20 seconds and a filterability of 130, and was excellent in the filterability and spinnability.

COMPARATIVE EXAMPLE 1

Wood pulp having an α-cellulose content of about 97 wt. % (dry basis) was dried so that the water content was reduced to about 5%. To 100 parts by weight of α-cellulose was added 25 parts by weight of glacial acetic acid, and the mixture was stirred at 40° C. for 3 hours to effect the pretreatment for activation. The activated cellulose was charged in a kneading acetylating machine and a mixture of 280 parts by weight of acetic anhydride and 450 parts by weight of acetic acid, which were cooled to 10° C. in advance, were added to 100 parts by weight of the α-cellulose, and the temperature was lowered to −5° C. over a period of about 50 minutes. Then, 13.5 part by weight of concentrated sulfuric acid was added and the acetylation reaction was carried out for 240 minutes by maintaining the temperature at below 35° C. by continuous cooling. Then, 2 parts by weight of concentrated sulfuric acid and 30 parts by weight of water were added and the mixture was stirred for 60 minutes. The reaction product was transferred into an aging reaction vessel and the reaction product was maintained at 25° C. for 60 hours to effect the aging reaction. Then, 123.7 parts by weight of a 20% aqueous solution of magnesium acetate was added to completely neutralize the sulfuric acid. Subsequent treatments were carried out in the same manner as described in Example 1.

This Comparative Example illustrates an example of the low-temperature acetylation and low-temperature aging process, a standard conventional process.

The cellulose acetate obtained in this Comparative Example was characterized by an acetylation degree of 55.0%, a viscosity of 22 seconds and a filterability of 150 and it was found that the product had a standard quality with good filterability and spinnability.

COMPARATIVE EXAMPLE 2

After 280 parts by weight of acetic anhydride and 450 parts by weight of glacial acetic acid were added to the same activated cellulose as obtained in Comparative Example 1, employed in the same amount as described in Comparative Example 1, and the mixture was sufficiently blended, 3 parts by weight of concentrated sulfuric acid was added to the reaction mixture and the reaction was started at 10° C. Cooling was adjusted so that the temperature rose to 68° C. over a periof of 50 minutes and this temperature was maintained for 10 minutes to effect the acetylating reaction. Then, 2 parts by weight of sulfuric acid and 30 parts of water were added to the reaction mixture and the reaction mixture was stirred for 60 minutes. The reaction mixture was gradually cooled to 25° C. and ripening was conducted at this temperature for 72 hours. Subsequent treatments were carried out in the same manner as described in Comparative Example 1.

This Comparative Example illustrates an example of the high-temperature acetylation and low-temperature ripening process.

The obtained cellulose acetate was characterized by an acetylation degree of 55.1%, a viscosity of 10 seconds and a filtrability higher than 1000. Reduction of the degree of polymerization was observed and the filterability was very poor.

The embodiments of the invention in which an exclusive property or privilege is claimed are defined as follows:

1. A process for preparing cellulose acetate, which comprises (A) forming a reaction mixture of activated cellulose, acetic anhydride in an amount of from 1.5 to 6 times the amount of said cellulose and an effective catalytic amount of an acidic catalyst in an amount less than 1/20 of the amount of said cellulose, at about ambient temperature or up to 50° C., elevating the temperature of said reaction mixture to 50° to 85° C. over a period of 20 to 60 minutes at a substantially uniform temperature elevating rate and then maintaining said reaction mixture at said temperature of 50° to 85° C. for from 3 to 20 minutes, and (B) then neutralizing said acidic catalyst in the reaction mixture containing primary cellulose acetate obtained in step (A) and hydrolyzing the reaction mixture at a temperature of from 110° to 120° C. in a bath in which water is incorporated.

2. A process for preparing cellulose acetate according to claim 1, wherein the activated cellulose is obtained by adding to a starting cellulose material, an acid material selected from the group consisting of acetic acid or a mixture of acetic acid and sulfuric acid, in an amount not more than about ¼ of the weight of the starting cellulose material and treating the starting cellulose material with said acid material for 20 to 60 minutes.

3. A process for preparing cellulose acetate which consists essentially of: mixing α-cellulose starting material with a first acid material selected from the group consisting of glacial acetic acid and a mixture of glacial acetic acid and sulfuric acid, the amount of said first acid material being not more than about 25% by weight, based on the weight of said α-cellulose starting material, and maintaining said mixture at an elevated temperature for from 20 to 60 minutes to transform said α-cellulose to an activated cellulose; then adding to said mixture a second acid material selected from the group consisting of a mixture of acetic anhydride and glacial acetic acid and a mixture of acetic anhydride, glacial acetic acid and sulfuric acid, to form an acetylation reaction mixture containing from 200 to 400% by weight of acetic anhydride, based on the weight of said activated cellulose, and containing an effective catalytic amount of sulfuric acid but less than about 5% by weight, based on the weight of said activated cellulose, and cooling said acetylation reaction mixture so as to permit the temperature of said acetylation reaction mixture to rise, due to the exothermic heat of reaction, at a uniform rate of temperature increase, from about room temperature or below up to a final reaction temperature of from 50° to 85° C. over a period of from 20 to 60 minutes and then maintaining the acetylation reaction mixture at said final reaction temperature for from 3 to 20 minutes to complete the acetylation reaction; then adding a neutralizing agent to completely neutralize said sulfuric acid in the acetylation reaction mixture, then placing the acetylation reaction mixture in a closed vessel and blowing steam thereinto to raise the temperature of the contents of said vessel to an ripening reaction temperature of from 110° to 120° C. and maintaining said contents of said vessel at said ripening reaction temperature for from 2 to 10 hours to effect hydrolysis; and then treating said contents to recover said cellulose acetate.

* * * * *